(12) United States Patent
Buttolo et al.

(10) Patent No.: US 10,571,907 B2
(45) Date of Patent: Feb. 25, 2020

(54) METHOD AND APPARATUS FOR DYNAMIC REMOTE CONTROL RECONFIGURATION BASED ON PROXIMITY TO A VEHICLE

(71) Applicant: FORD GLOBAL TECHNOLOGIES, LLC, Dearborn, MI (US)

(72) Inventors: Pietro Buttolo, Dearborn Heights, MI (US); Stuart C. Salter, White Lake, MI (US); Annette Lynn Huebner, White Lake, MI (US); Paul Kenneth Dellock, Northville, MI (US); James Stewart Rankin, II, Novi, MI (US)

(73) Assignee: Ford Global Technologies, LLC, Dearborn, MI (US)

(\*) Notice: Subject to any disclaimer, the term of this patent is extended or adjusted under 35 U.S.C. 154(b) by 102 days.

(21) Appl. No.: 15/496,665

(22) Filed: Apr. 25, 2017

(65) Prior Publication Data
US 2018/0307227 A1    Oct. 25, 2018

(51) Int. Cl.
*G06F 19/00* (2018.01)
*G05D 1/00* (2006.01)
*B62D 15/02* (2006.01)
*B60W 30/00* (2006.01)
*G08G 1/16* (2006.01)

(52) U.S. Cl.
CPC ............ *G05D 1/0038* (2013.01); *B60W 30/00* (2013.01); *B62D 15/025* (2013.01); *B62D 15/0265* (2013.01); *G05D 1/0016* (2013.01); *G05D 1/0044* (2013.01); *G05D 1/0061* (2013.01); *G05D 1/0088* (2013.01); *G08G 1/16* (2013.01); *G05D 2201/0213* (2013.01)

(58) Field of Classification Search
CPC .. G05D 1/0038; G05D 1/0016; G05D 1/0044; G05D 1/0061; G05D 1/0088; G08G 1/16
USPC .......................................................... 701/1, 2
See application file for complete search history.

(56) References Cited

U.S. PATENT DOCUMENTS

| | | | |
|---|---|---|---|
| 9,317,983 B2* | 4/2016 | Ricci | H04W 4/21 |
| 10,083,604 B2* | 9/2018 | Ricci | G08G 1/017 |
| 2014/0306826 A1* | 10/2014 | Ricci | H04W 4/21 340/573.1 |
| 2014/0309789 A1* | 10/2014 | Ricci | B60Q 1/00 700/276 |
| 2014/0309806 A1* | 10/2014 | Ricci | B60Q 1/00 701/1 |
| 2015/0232065 A1* | 8/2015 | Ricci | B60R 25/01 701/36 |
| 2016/0066127 A1 | 3/2016 | Choi et al. | |
| 2016/0171521 A1* | 6/2016 | Ramirez | G06Q 30/0224 701/409 |
| 2016/0203649 A1 | 7/2016 | Berkobin et al. | |
| 2017/0200197 A1* | 7/2017 | Brubaker | G09F 9/35 |
| 2018/0130347 A1* | 5/2018 | Ricci | B60R 25/2018 |

\* cited by examiner

*Primary Examiner* — Ronnie M Mancho
(74) *Attorney, Agent, or Firm* — Michael Spenner; Brooks Kushman P.C.

(57) ABSTRACT

A system includes a processor configured to provide a remote vehicle controller a varied level of vehicle driving control, to drive a vehicle via the controller, responsive to a determination of the remote vehicle controller location relative to the vehicle. The controller interface may be visually adaptable based on a particular designated style of control, including, for example, in-vehicle control, near-vehicle control and far-from-vehicle control.

20 Claims, 7 Drawing Sheets

METHOD AND APPARATUS FOR DYNAMIC REMOTE CONTROL RECONFIGURATION BASED ON PROXIMITY TO A VEHICLE

TECHNICAL FIELD

The illustrative embodiments generally relate to methods and apparatuses for dynamic remote control reconfiguration based on proximity to a vehicle.

BACKGROUND

There is an ongoing push in the automotive industry to develop and mainstream autonomous vehicles. These self-driving vehicles will generally work in the absence of any direct driver control and are on the cusp of widespread adoption.

Fully autonomous vehicles might not come equipped with an in-vehicle driving interface, like the steering wheel, shifter and pedals included in current vehicles. There will be times, however, when manual control, or supervised autonomous controlled is desired, such as when loading/unloading vehicles from a truck, during or post assembly at the factory, in storage facilities, or because of some autonomous guidance module failures.

One solution is to provide conventional control mechanisms to autonomous vehicles, but this can be an expensive solution and may result in an inability to otherwise fully utilize cabin interior in a desirable manner.

SUMMARY

In a first illustrative embodiment, a system includes a processor configured to provide a remote vehicle controller a varied level of vehicle driving control, to drive a vehicle via the controller, responsive to a determination of the remote vehicle controller location relative to the vehicle.

In a second illustrative embodiment, a system includes a remote control processor, in wireless communication with a vehicle, configured to provide an interface corresponding to a varied level of vehicle driving control, responsive to permissions granted by the vehicle based on detected location of a remote control, including the processor, relative to the vehicle.

In a third illustrative embodiment, a computer-implemented method includes dynamically selecting and displaying a control interface from a varied set of vehicle control interfaces and associated functionality, providing differing types of vehicle control, the selecting responsive to whether a controller, on which the interface is displayed, is detected as being within a vehicle, outside the vehicle and within a predefined distance from he vehicle, or outside the vehicle and more than the predefined distance from the vehicle.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
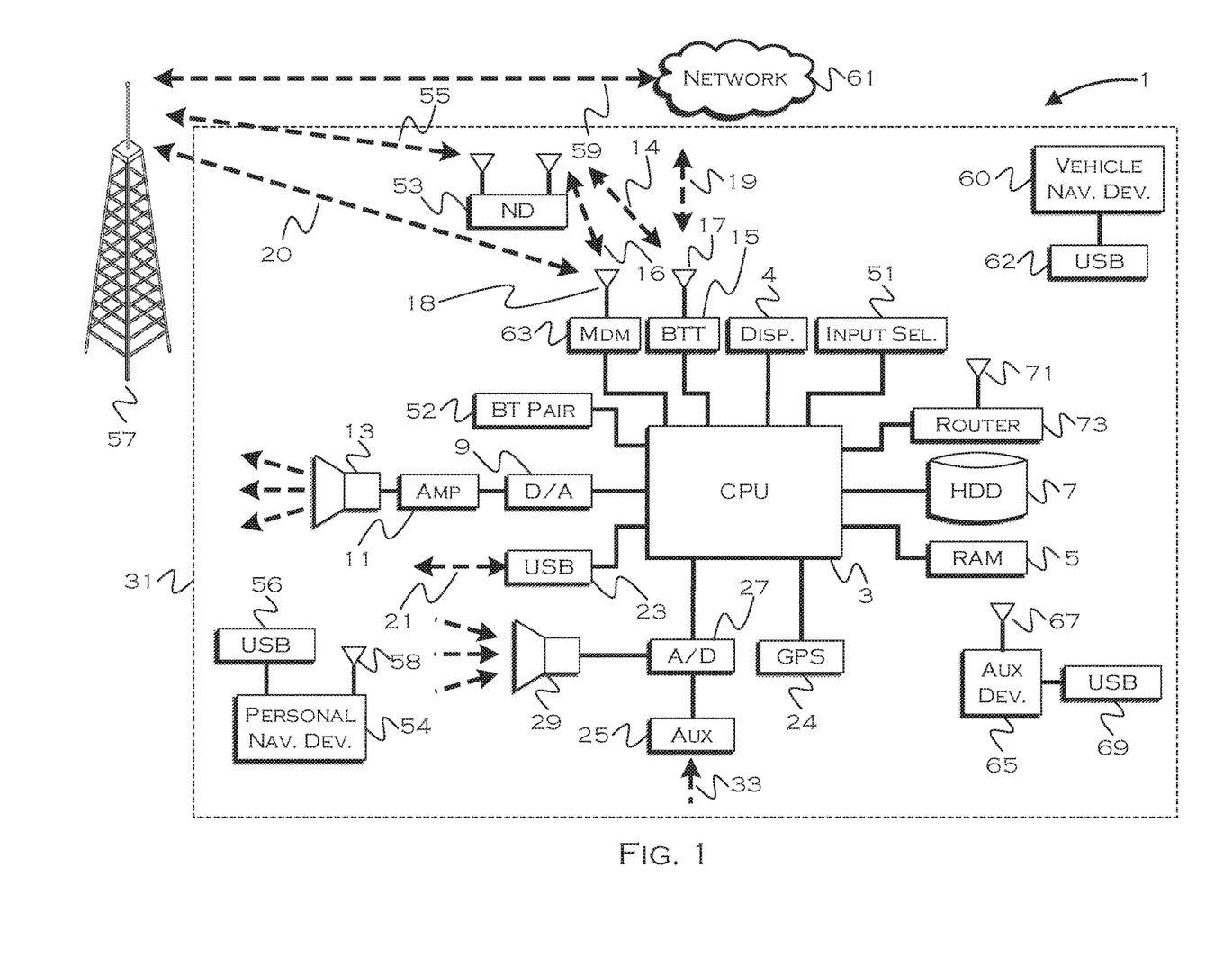
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

There is a need for a portable, pocket-size controller, either wired or wireless, that operators at a service station, factory or transportation utility can carry with them and use as needed. The controller can implement a robust authentication method that cannot be broken by someone trying to gain control of the vehicle with malicious intent. The controller may also be intuitive to use for vehicle control in a varied set of circumstances. It may allow for full/assisted manual control with the operator inside the vehicle or the operator outside but in close proximity of the vehicle, and also for supervised control with the operator further removed from the vehicle.

Figure 2:
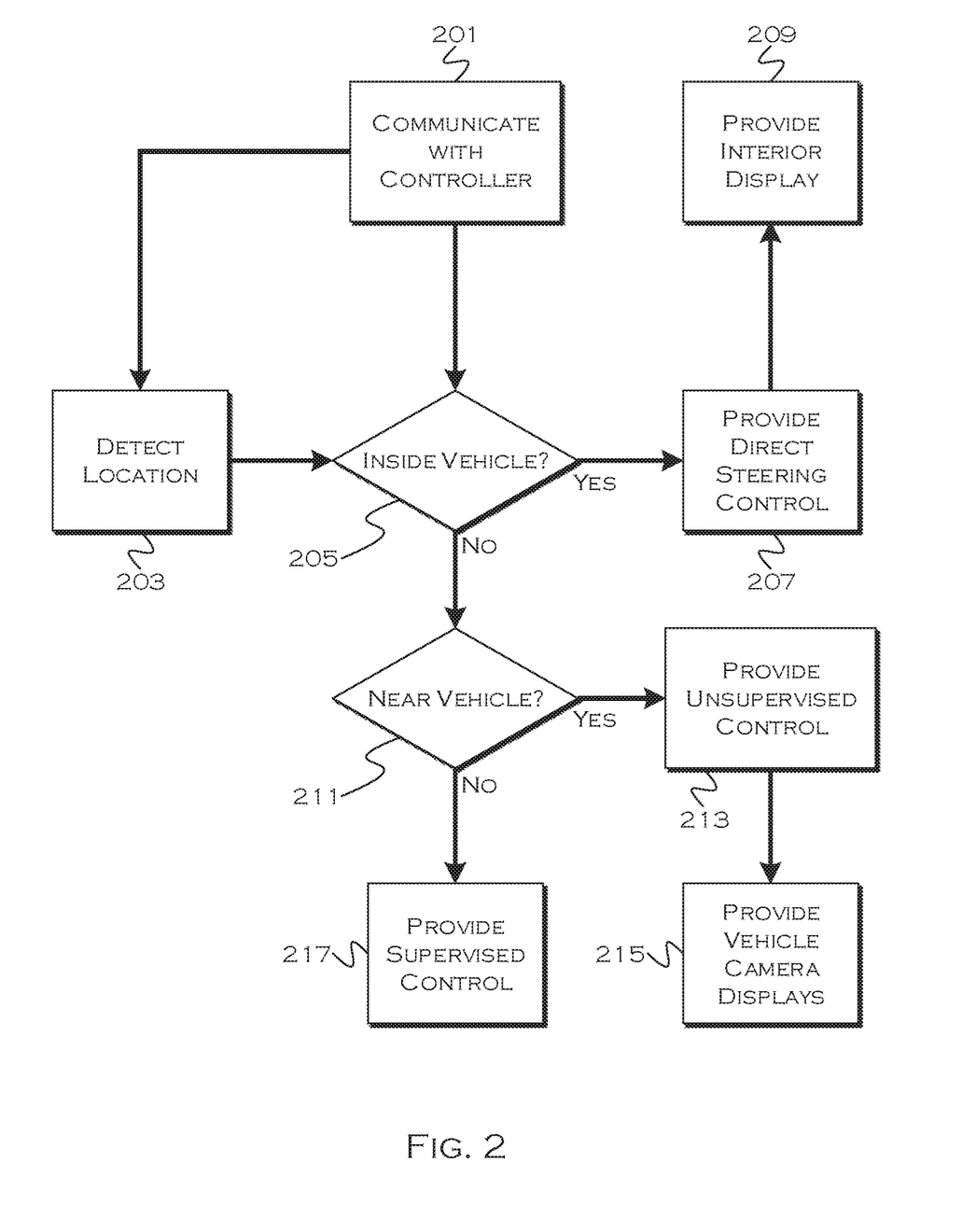
FIG. 2 shows an illustrative example of a control-selection process.

FIG. 2 shows an illustrative example of a control-selection process. In this example, the remote controller provides a varied level of protection based on where the controller is located relative to the vehicle. While three versions of control are shown, more versions based on proximity or other reasonable variables are also possible.

In this example, the three types of control are direct control, unsupervised control and supervised control. In direct control mode, the controller functions as a steering wheel for the vehicle. The controller may be attached directly to the vehicle, resembling a conventional steering wheel, or a user may simply use the controller as a steering wheel without actually attaching the controller. Since the user is inside the vehicle while this control is engaged, the user is able to see the perspective of a driver of the vehicle. The controller may also replicate this perspective on a display, in case the user is not in the best position/orientation inside the vehicle. By turning the controller, the user can turn the vehicle, and the user can access braking, acceleration and gearshifting (along with other typical vehicle controls) from the display of the controller.

In unsupervised control mode, the user controls the vehicle much as one would control a remote control car. In this mode, the user is proximate to (within a predefined distance) the vehicle, but not inside the vehicle. Thus, the user is typically standing outside the vehicle and controlling the motion of the vehicle through the controller. While the user may use the controller to accelerate, brake and steer, the controller in this control mode may display forward, rear and side camera views, to assist the user in obstacle avoidance. The user may also be able to switch to a more conventional forward or rearward view, and also may be able to switch the controller display between various available camera views. In this mode, speed may be limited, and vehicle safety systems (LIDAR, RADAR, etc.) may assist the user in obstacle avoidance, such as by braking the vehicle if the vehicle comes too close to a fixed or hazardous object.

In supervised control mode, the user is outside the vehicle and outside the predetermined range for unsupervised control. In this mode, the user may be shown a top down view of a map, including a current vehicle location and some surrounding areas. The user can tap (with a finger, for example) a destination for the vehicle, and the vehicle can autonomously navigate to or near to the selected destination. The user may also be able to zoom in and out and rotate the view, much as one could control a conventional digital map displayed on a smart phone. In this mode, the steering, acceleration and deceleration capabilities of the controller may be disabled, since the vehicle may be driving itself.

Figure 5:
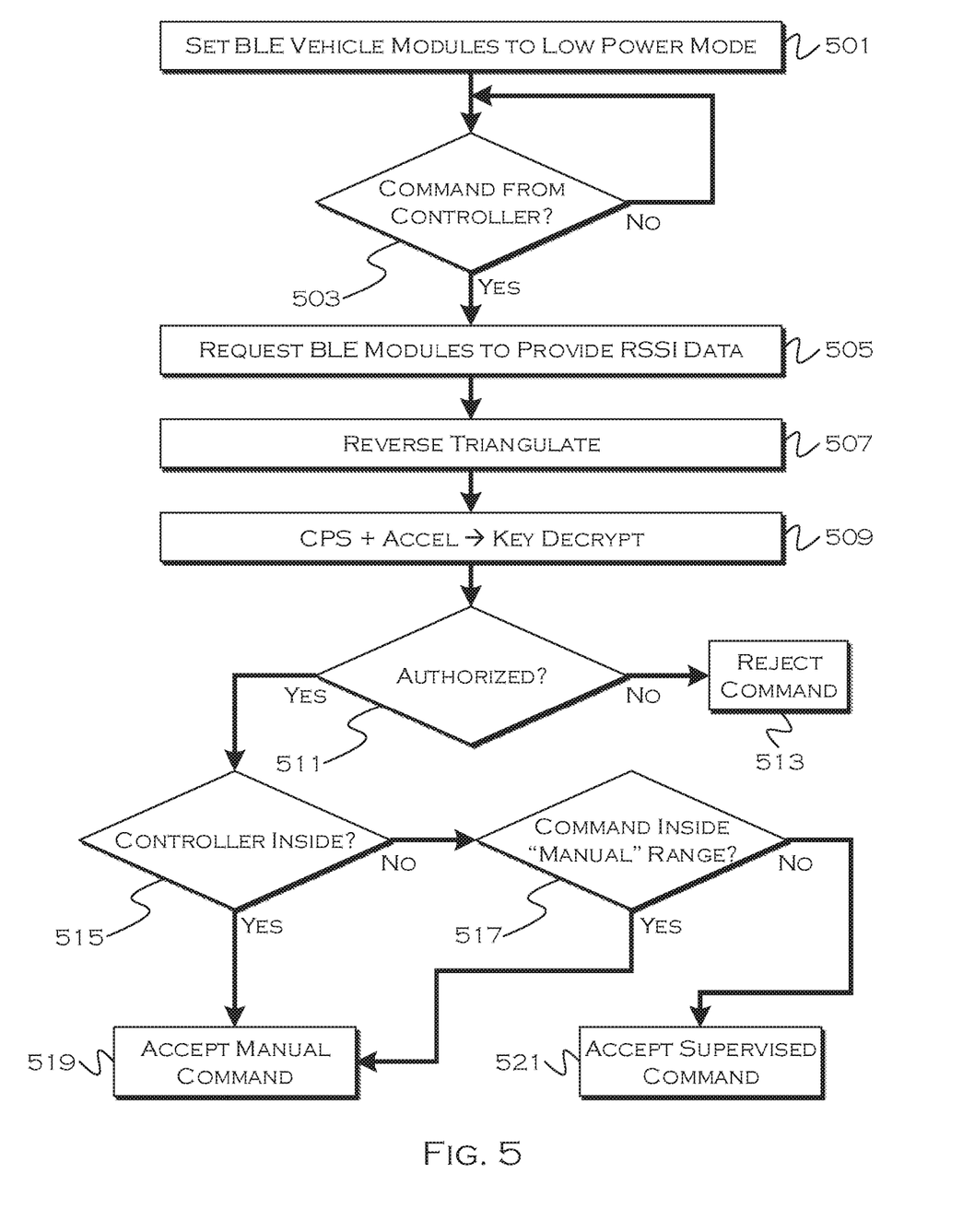
FIG. 5 shows an illustrative example of a vehicle/controller authentication process.

In the process shown, the vehicle communicates with the controller 201 to establish an initial connection. This may also involve authentication, as shown in FIG. 5. The vehicle may authenticate the connection, and determine 203 the location of the controller relative to the vehicle. That is, in this example, the vehicle determines if the controller is inside, outside within a predetermined proximity, or outside and further than the predetermined proximity.

If the controller is inside the vehicle 205, the process provides 207 direct control over the vehicle. This can include, for example, creating permission for direct acceleration and deceleration control, as well as shifting control. If desired, this can also include directing a camera feed to the controller display, but presumably the user should be able to look out of the front and rear windshields much as a current conventional driver. In this example, providing direct control includes at least providing 209 vehicle system controls (pedals, gearshift, etc.) to the controller.

If the controller is not inside the vehicle, but is within a predetermined proximity to the vehicle 211, the process may provide 213 unsupervised control over the vehicle. In this example, this means that the user can use the controller to steer, accelerate and decelerate the vehicle. Since the user is not inside the vehicle, the process also sends 215 one or more camera feeds to the controller. The process may also engage 218 a form of active safety control, which could brake or otherwise control the vehicle to prevent a collision detected by vehicle sensors. In one embodiment, the user is given free control over the vehicle until such an incident is imminent.

If the controller is outside the vehicle and outside the predetermined proximity, the process may provide 217 supervised control. In this version, the controller may display a top down or other high-level view of the vehicle and surrounding environment. The user can touch the display to direct vehicle movement, and may also be able to zoom in and out to more precisely position the vehicle or access a wider range of destinations, respectively. While it is possible to provide the user with control of the vehicle, in this example the vehicle operates autonomously, and the user merely acts as a director of the final destination. Since the vehicle may be out of user visual-range, it may be difficult to provide direct control without some assurances that the user can safely operate the vehicle. It may also be possible to provide a version of the unsupervised direct control as long as the vehicle is traveling at a speed lower than a predefined maximum, although in other instances there simply is no direct control available while the vehicle remains further from the controller than the predetermined proximity.

Figure 3A:
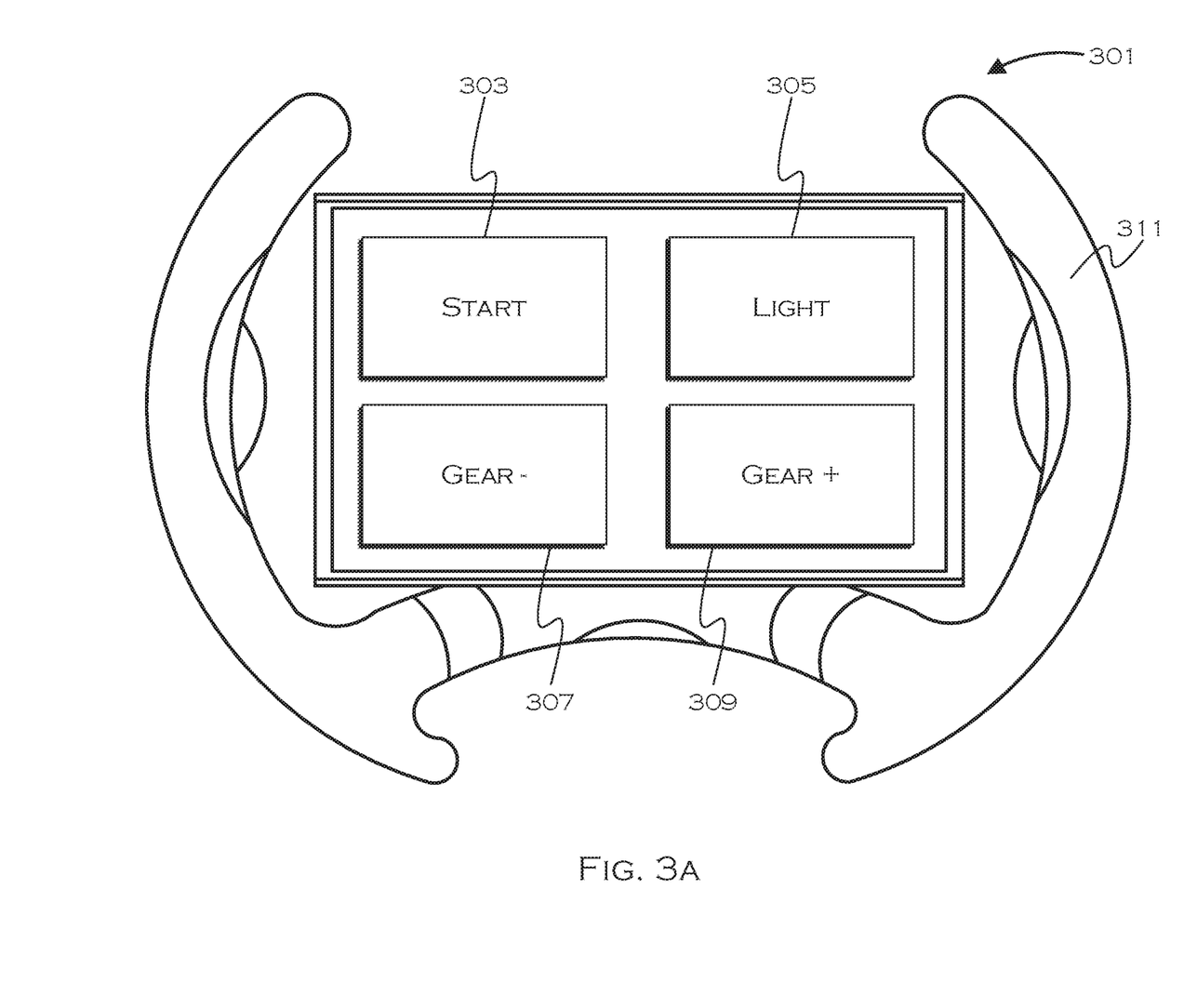
FIG. 3A shows an illustrative example of the controller and a direct control mode.

FIG. 3A shows an illustrative example of the controller and a direct control mode. This is one non-limiting form the controller 301 may take, and in this example it includes two hand grips 311 and a display. Multi-axis accelerometers may be provided to the controller in this example, so that user movement of the controller can be detected and translated into control commands. The illustrative controller consists of handles shaped like a steering wheel, a touch screen for I/O, an optional small camera mounted on the top-side, gyroscope+magnetometer+accelerometer for orientation and motion sensing, and LTE/WiFi/BLE modules for connectivity. A snap-on monopod pivoting on the back can be used to improve stability for in-vehicle operation In this example, since the controller (and thus the user) is inside the vehicle, the display is not showing a camera view. A camera view may be selectably displayed if desired, but this example uses the bulk of the display space to display vehicle controls. A start/stop button may be displayed 303, which controls powering the vehicle. Vehicle lighting controls may also be provided 305 for control over exterior lights.

In this example, the controller includes gearshifting controls 307 and 309, although acceleration and braking controls could also be possible, as well as any other reasonable vehicle system controls.

It is also possible to achieve acceleration and deceleration through movement of the controller or a controller element. For example, a user could tilt the controller forward to move the vehicle forward, and backwards to move the vehicle backwards. In another example, one of the controller arms 311 could rotate forward and backward, and correspondingly control acceleration, deceleration and reversing the vehicle. Pushbutton acceleration and deceleration (using physical buttons) is also possible.

Figure 3B:
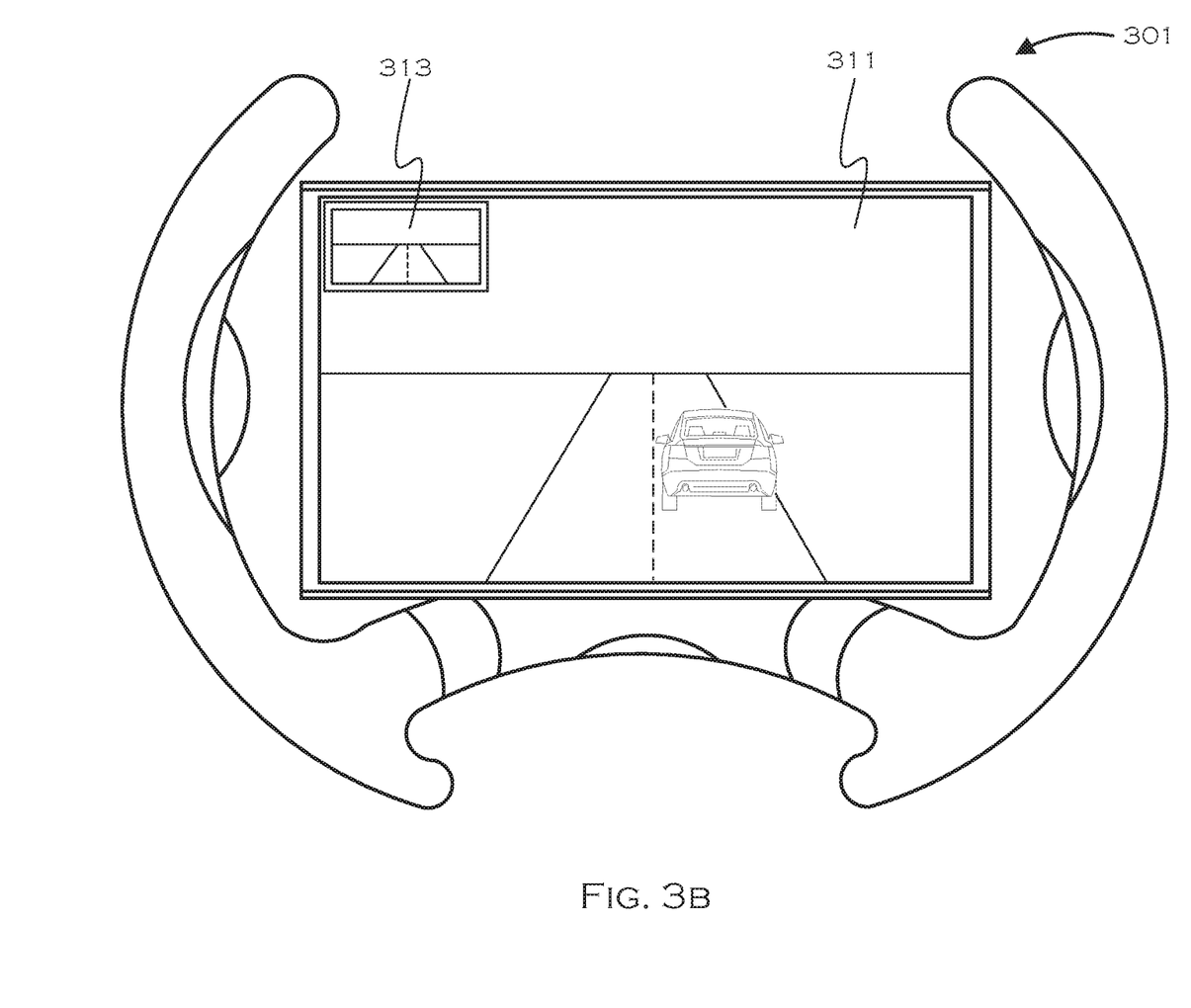
FIG. 3B shows an illustrative example of unsupervised control.

FIG. 3B shows an illustrative example of unsupervised control. In this example, the controller communicates with the vehicle to obtain feeds from a number of vehicle cameras. Here, the controller display shows a forward view 312 and a side/rear view 313. In this example, the side/rear view is a composite of multiple camera views, providing maximal viewing area, although a single camera view could also be used. Also, when the vehicle changes directions, the view and/or compositing could change. Rear moving vehicles could be shown as a rearward and/or composited view of the area behind the vehicle, and turning vehicles may be shown as a side view split with a front view and/or a composited side and front view (to provide a better view of the turn region).

Other camera solutions are also possible, such as a top-central camera with a lens array, showing 360 degrees of view and selectively displaying the primary view as a lens or composite of the direction in which motion occurs, and the secondary view(s) as views or composites from the other lenses. The camera may even be able to rotate as the vehicle turns, to best orient the view towards a region which the vehicle is entering.

Figure 3C:
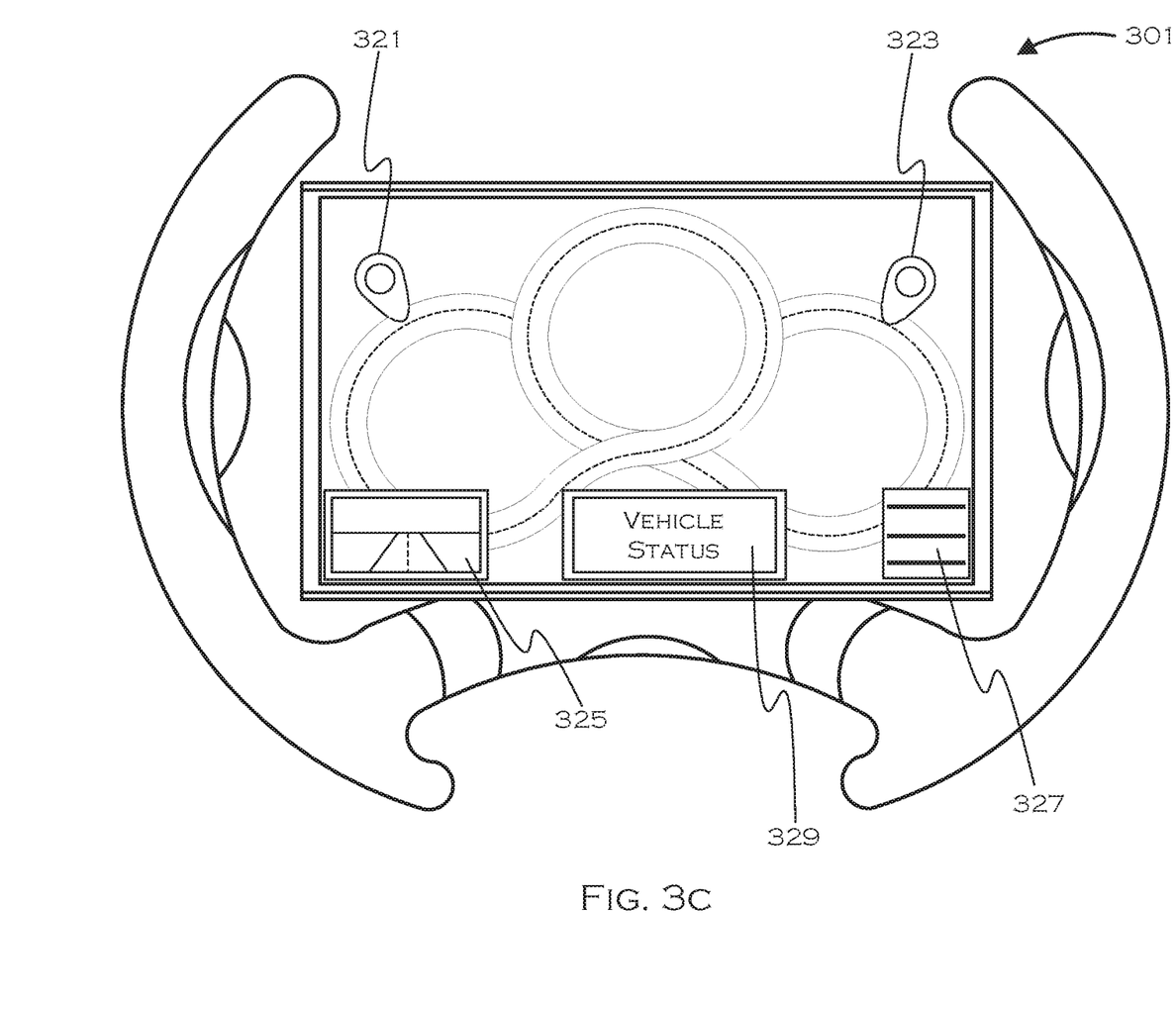
FIG. 3C shows an illustrative example of a supervised control mode.

FIG. 3C shows an illustrative example of a supervised control mode. In this example, any controller direct control of the vehicle may be disabled, and instead the controller shows a user a map including the vehicle location 321 and a selected target destination 323. The display may also include a menu 327 (for accessing cameras or other vehicle functions), a current vehicle status 329 (powered, moving, etc) and at least one forward camera view 325 showing a view in the direction in which the vehicle is moving.

Figure 4:
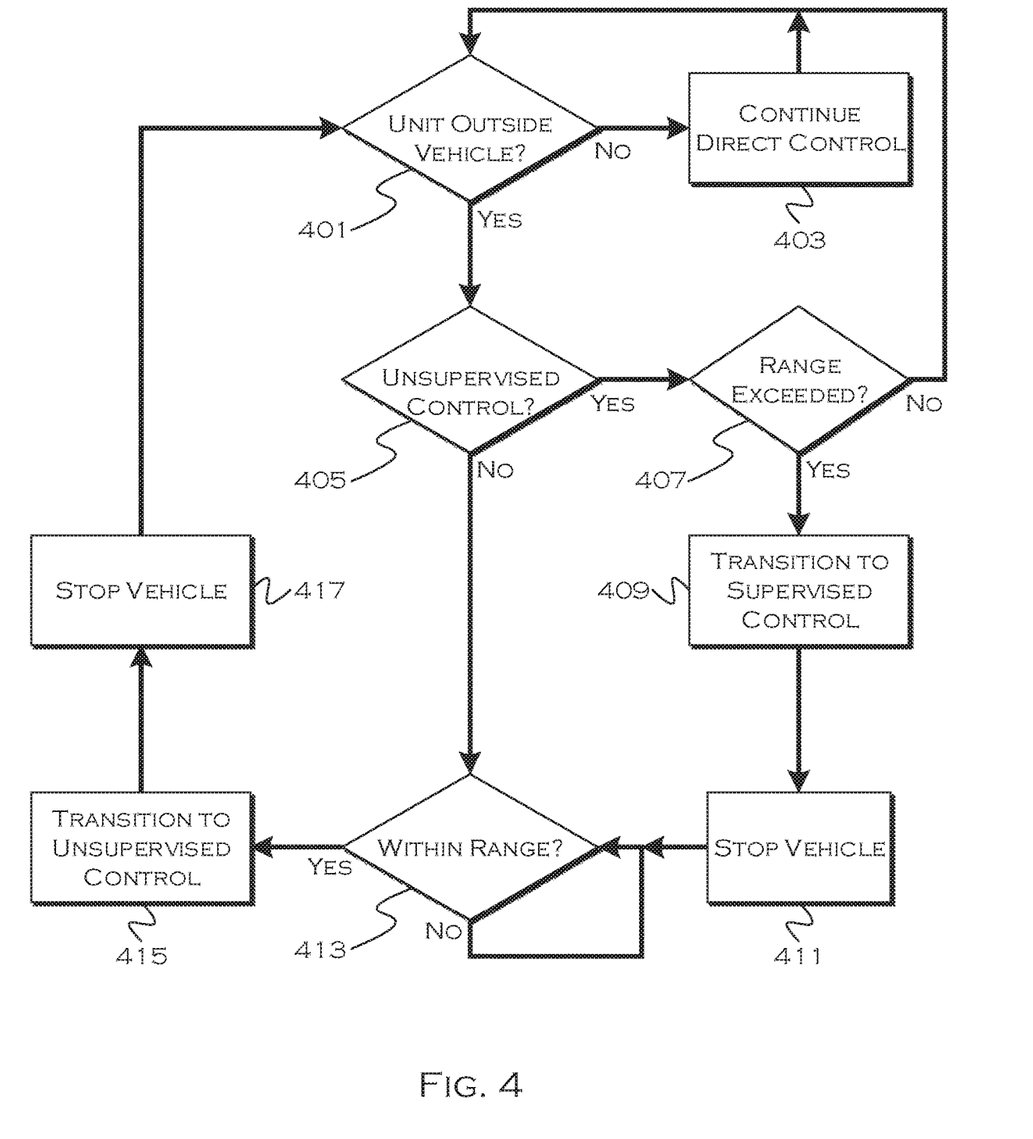
FIG. 4 shows an illustrative example of a control-switching process.

FIG. 4 shows an illustrative example of a control-switching process. It may be desirable to provide continual control capability, without having to reconnect or reconfigure a controller. In this example, the user may transition from various control states based on controller location relative to a vehicle. So, for example, the user could begin a journey inside a vehicle, arrive at a destination, exit the vehicle, go into a store and then it begins raining. Since the user may be more than the predetermined proximity from the vehicle, the user may use supervised control to summon the vehicle, unsupervised control to maneuver the vehicle up to a user location (once the vehicle was within the proximity to the controller) and then re-enter the vehicle and resume direct control.

In this example, communication has already been established between the remote control and the vehicle, and the process determines whether the controller is presently within the vehicle interior 401. If the controller is inside the vehicle, the process continues/begins 403 direct vehicle control. As long as the unit remain inside the vehicle, the process provides direct control over the vehicle.

At some point, the user (and controller) may exit the vehicle, and the process then determines if unsupervised control is permissible 405 (e.g., the controller is still within proximity to the vehicle). If the unit has shifted to unsupervised control, the process determines whether or not the remotely controlled vehicle remains 407 within unsupervised control range. This could be, for example, the user exiting the vehicle and slightly adjusting a parking job, or the preceding example of exiting supervised control range and controlling the vehicle directly to a specific location.

If the vehicle moves outside of the predetermined proximity for unsupervised control, in this example, the process transitions 409 the vehicle to a supervised control mode. Also, in this example, the process stops 411 the vehicle each time a control mode transitions, to avoid unspecified vehicle movement. Automatically engaging autonomous driving while control modes transition would be another option, but this example demonstrates the vehicle being stopped at each transition. If the vehicle were in traffic or another situation whereby a stop is not entirely reasonable, the process may pull the vehicle over to the side of the road, or otherwise safely navigate the vehicle in the absence of explicit instruction.

As long as the vehicle remains outside the range of unsupervised control 413, the process continues in supervised control mode. Once the vehicle comes within the predetermined proximity for unsupervised control, the process may transition 415 the control to unsupervised control and again stop 417 the vehicle. This control selection process may be ongoing as long as the vehicle is powered, as long as the vehicle is in communication with the controller, etc.

FIG. 5 shows an illustrative example of a vehicle/controller authentication process. Since a remote control is used to directly control a vehicle, it is reasonable to utilize strong encryption to prevent unauthorized access. In this example, once the vehicle begins attempting to communicate with the controller, the vehicle sets wireless detection modules (BLUETOOTH low energy, BLE module, in this example) to a low power mode. This limits the detection range of the modules and helps ensure that someone is not controlling the vehicle from a long distance away. Supervised control may require longer range communication, such as WiFi or LTE. This may require a modem on the vehicle. Because supervised control also may relies on software encryption—e.g., no signal strength, geolocation, or accelerometer pattern to validate—it may not be as secure as the other control modes.

Once the vehicle receives 503 a connection command from a controller, the process requests the BLE modules to provide received signal strength indicator (RSSI) data. RSSI is a method of detecting the relative distance of a signal-receiving unit based on an observed drop in signal strength from the transmission strength to the received strength. RSSI in this example is used in conjunction with multiple BLE modules to determine a units relative position to multiple modules, allowing triangulation of the unit location to assist in determining whether or not the unit is inside or outside a vehicle.

In this example, the process also encrypts connection and control data with a formula that incorporates both the vehicle GPS and vehicle acceleration data. The vehicle decrypts 509 a command from the controller to determine if the controller is authorized 511 to control the vehicle.

According to one illustrative authentication method, designed to resist relay attacks, two parties communicating, in this case a vehicle and a controller, have a pre-agreed upon shared keys and a shared geo-location offset. The geo-location offset is added to the current coordinates acquired from GPS and sent as part of the encrypted message that is sent from one to the other party.

When the message is received and decrypted, the geo-location offset is subtracted to obtain the sender actual geo-location. The receiver may only acknowledge and act on the message if the geo-location of the sender and receiver are inside a "radius" of proximity, thus defeating many relay-attacks. This scheme works for both the "inside" and "outside" the vehicle scenarios.

The signal from the accelerometer/gyroscope/magnetometer can also be used to introduce a physical parameter to the encryption. This may only apply to the "inside" the vehicle scenario where both vehicle and controller monitor their respective acceleration. While there may be some differences in their pattern, because they are not rigidly coupled and due to other noise, the values should be reasonably similar to each other as the vehicles travels to destination.

Parameters extracted from the pattern, such as direction and magnitude of acceleration, orientation, are sent as part of the encrypted packet from the controller to the vehicle. The vehicle will acknowledge and act on the request from the controller if its own accelerometer/gyroscope, etc. signal is within a tolerance window of the device parameter.

These are a few of the authentication techniques that can improve reliability and resistance to outside attacks. Other suitable authentication techniques could also be used.

If the controller is not authorized, the vehicle rejects 513 the connection attempt and/or any commands. If the controller is authorized, the vehicle determines 515 whether or not the controller is inside the vehicle. If the controller is inside the vehicle, the process accepts 519 manual and direct control over the vehicle from the controller. If the controller is outside the vehicle, the process determines 517 whether or not the vehicle is within unsupervised (manual) control range. If the vehicle is outside the predetermined proximity from the controller, the process accepts 521 commands in the supervised control format.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
provide a remote vehicle-control device, usable to instruct vehicle control, to provide a varied level of vehicle driving control, to drive a vehicle via the vehicle-control device, responsive to a determination of a location of the vehicle-control device relative to the vehicle.

2. The system of claim 1, wherein the determination includes determining that the vehicle-control device is inside a vehicle.

3. The system of claim 2, wherein the processor is configured to provide direct vehicle driving control, responsive to determining that the vehicle-control device is inside the vehicle.

4. The system of claim 3, wherein the processor is configured to provide vehicle acceleration and deceleration control to the vehicle-control device, as part of the direct vehicle driving control.

5. The system of claim 1, wherein the determination includes determining that the vehicle-control device is outside the vehicle, but within a predetermined proximity to the vehicle.

6. The system of claim 5, wherein the processor is configured to provide vehicle-assisted direct vehicle driving control, responsive to determining that the vehicle-control device is outside of, but within a predetermined proximity to, the vehicle.

7. The system of claim 6, wherein the vehicle-assisted direct vehicle driving control includes sending one or more vehicle camera feeds to the vehicle-control device.

8. The system of claim 7, wherein the vehicle-assisted direct vehicle driving control includes automatically braking or steering the vehicle, while otherwise under user control, to avoid detected obstacles.

9. The system of claim 7, wherein the processor is configured to provide supervised vehicle driving control, responsive to determining that the vehicle-control device is outside the vehicle and outside a predetermined proximity from the vehicle.

10. The system of claim 9, wherein the processor is configured to provide the vehicle-control device with a map including the vehicle and a surrounding area.

11. The system of claim 10, wherein the processor is configured to receive touch selection of a destination on the map, displayed on the vehicle-control device, the selection transmitted to the processor, and wherein the supervised vehicle driving control includes autonomously navigating the vehicle from a present location to the selected destination.

12. The system of claim 1, wherein the processor is configured to transition between the varied level of driving control based on detected location state changes of the vehicle-control device relative to the vehicle.

13. A system comprising:
a remote control processor, in wireless communication with a vehicle, configured to:
provide an interface corresponding to a varied level of vehicle driving control, responsive to permissions granted by the vehicle based on detected location of a remote control-device, usable to instruct vehicle control, including the processor, relative to the vehicle.

14. The system of claim 13, wherein the remote control processor is configured to provide a display including vehicle driving system controls, responsive to permission from the processor for the remote control to act in a direct control manner.

15. The system of claim 13, wherein the remote control processor is configured to provide a display including live feeds from one or more vehicle cameras, responsive to permission from the processor for the remote control to act in a vehicle-assisted direct control manner.

16. The system of claim 13, wherein the remote control processor is configured to provide a map, showing a vehicle location and a surrounding area, responsive to permission from the processor for the remote control to act in a supervised vehicle control manner.

17. A computer-implemented method comprising:
dynamically selecting and displaying a control interface from a varied set of vehicle control interfaces and associated functionality, providing differing types of vehicle control, the selecting responsive to whether a vehicle-control device, usable to instruct vehicle control, on which the interface is displayed, is detected as being within a vehicle, outside the vehicle and within a predefined distance from the vehicle, or outside the vehicle and more than the predefined distance from the vehicle.

18. The method of claim 17, wherein the dynamically selecting and displaying includes selecting a control interface providing direct control over a vehicle, treating the controller as a vehicle steering wheel, when the controller is detected as being within a vehicle interior.

19. The method of claim 17, wherein the dynamically selecting and displaying includes selecting a control interface providing remote control over a vehicle, including an ability to directly adjust a vehicle path by manipulating the controller, the vehicle displayed in an overhead manner on the controller as part of the interface, when the controller is detected as being outside the vehicle but within the predefined distance from the vehicle.

20. The method of claim 17, wherein the dynamically selecting and displaying includes selecting a control interface providing limited remote control over a vehicle, limited to specifying a vehicle destination as a method of controlling the vehicle, when the controller is detected as being outside the vehicle and outside the predefined distance from the vehicle.

* * * * *